United States Patent [19]
Macdonald et al.

[11] Patent Number: 6,006,878
[45] Date of Patent: Dec. 28, 1999

[54] TORQUE CONVERTER BYPASS CLUTCH HAVING ELASTICALLY FLEXIBLE PISTON

[75] Inventors: Fraser John Macdonald, Farmington Hills; David Hargrave, Canton, both of Mich.

[73] Assignee: Ford Global Technologies, Inc., Dearborn, Mich.

[21] Appl. No.: 09/248,747

[22] Filed: Feb. 12, 1999

[51] Int. Cl.[6] .................................................. F16H 45/02
[52] U.S. Cl. .......................................... 192/3.29; 192/212
[58] Field of Search .................................. 192/3.28, 3.29, 192/3.3, 70.17, 212

[56] References Cited

U.S. PATENT DOCUMENTS

| | | |
|---|---|---|
| 3,839,864 | 10/1974 | Ahlen .................................. 192/3.27 X |
| 5,209,330 | 5/1993 | Macdonald . |
| 5,383,540 | 1/1995 | Macdonald . |
| 5,477,950 | 12/1995 | Maloof . |
| 5,515,956 | 5/1996 | Schoder et al. ......................... 192/3.29 |
| 5,682,969 | 11/1997 | Ling ........................................ 192/3.29 |
| 5,799,763 | 9/1998 | Dehrmann ............................... 192/3.29 |
| 5,813,505 | 9/1998 | Olsen et al. ............................ 192/3.28 |
| 5,819,896 | 10/1998 | Fallu ....................................... 192/3.29 |

*Primary Examiner*—Rodney H. Bonck
*Assistant Examiner*—Saùl Rodrìguez
*Attorney, Agent, or Firm*—Frank G. McKenzie

[57] ABSTRACT

A hydrokinetic torque converter includes an impeller cover and a bypass clutch. A drive ring is located between adjacent surfaces of the cover and a clutch piston, which deflects flexurally axially. The piston is welded to the cover at a radially inner position, which is supported at another radial location on the cover. The piston deflects into engagement with the drive ring, and the drive ring engages with the cover. When clutch apply pressure is reduced, energy, in the form of elastic bending potential energy stored in the piston, is used to move the piston out of engagement with the drive ring and cover.

19 Claims, 3 Drawing Sheets

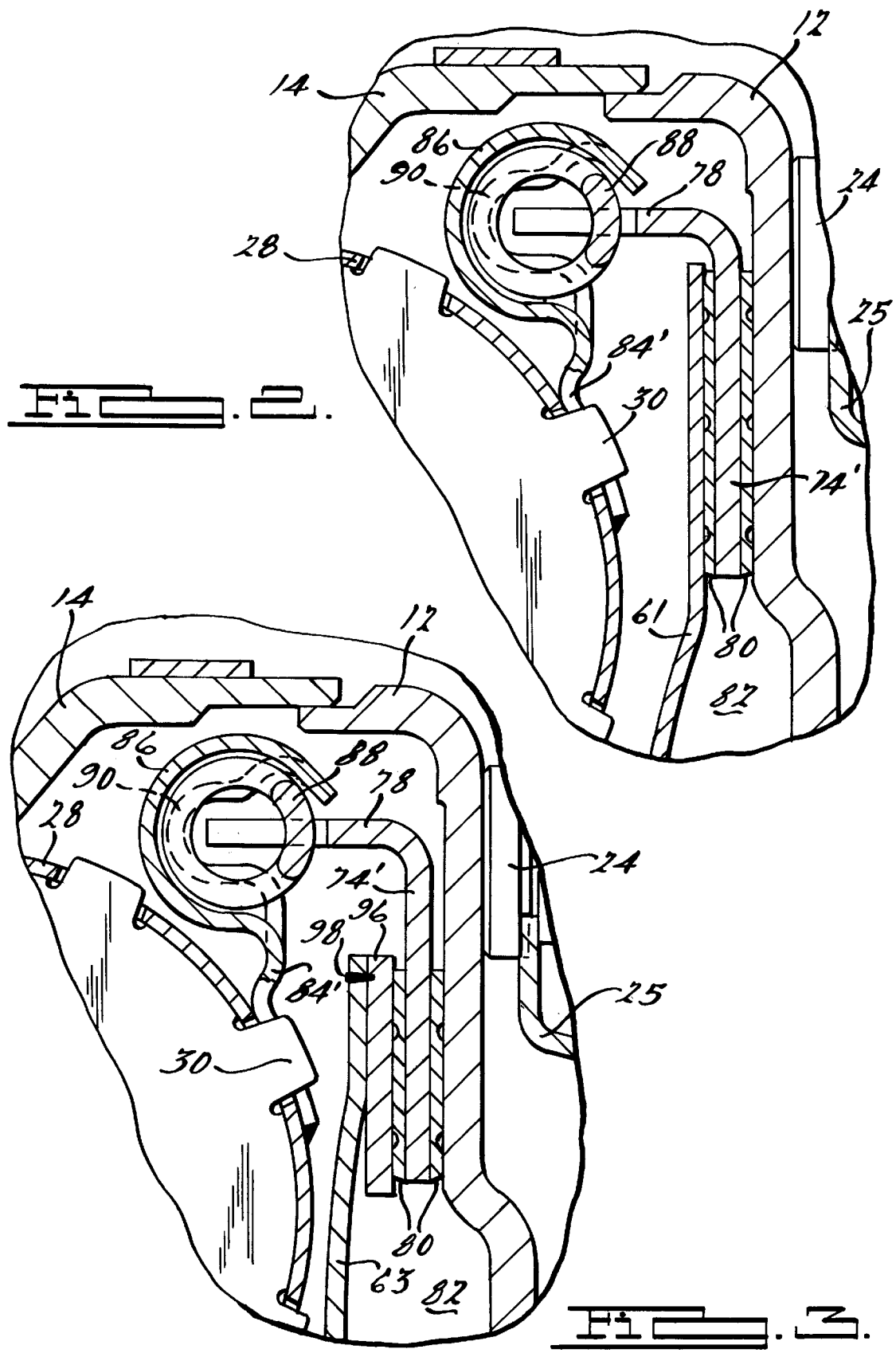

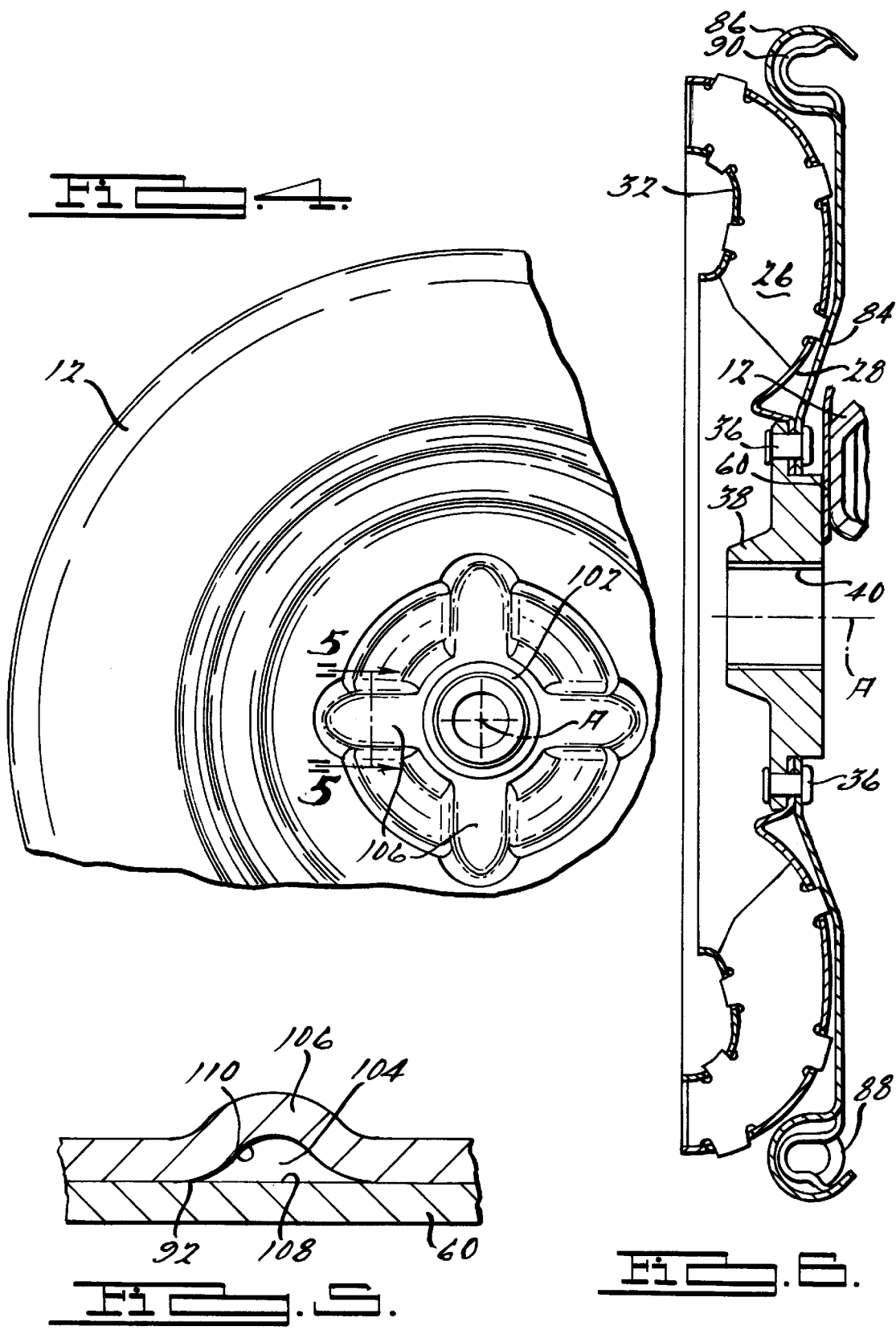

TORQUE CONVERTER BYPASS CLUTCH HAVING ELASTICALLY FLEXIBLE PISTON

BACKGROUND OF THE INVENTION

1. Field of the Invention

This invention relates to the field of automatic transmission hydrokinetic torque converters. The invention pertains particularly to a bypass clutch for a torque converter.

2. Description of the Prior Art

A device for deducing noise and vibration in a torque converter bypass clutch is described in U.S. Pat. No. 5,477,950, which is assigned to the assignee of this invention. The hydrokinetic torque converter includes an impeller wheel and turbine wheel. The housing for the impeller includes a lockup clutch assembly having a clutch plate that engages a friction surface on the impeller housing. The clutch plate carries friction material that establishes a frictional driving connection between the impeller and the turbine when differential pressure across the clutch plate is sufficient to establish a clutch-engaging force.

The clutch plate is connected through a damper assembly to the hub of the turbine, thus establishing a mechanical torque transfer between an engine crankshaft and the turbine shaft, which bypasses the hydrokinetic torque flow path through the torque converter.

The clutch plate is both welded to the impeller cover and pinned to the clutch piston. Furthermore, the pin that connects the piston and plate carries a spring-loaded detent ball that is forced radially outward from the piston into contact with the plate. This arrangement driveably connects the plate and piston, and transmits torque between the components of the assembly without producing noise, despite engine speed torque and speed variations.

It is preferable that a minimum number of parts be used to produce a resilient connection between the impeller cover and bypass clutch piston including elimination of the thrust washer between the turbine hub and clutch piston.

SUMMARY OF THE INVENTION

It is an object of the present invention to provide a functionally improved torque converter bypass clutch having fewer parts, a smaller package space requirement and reduced complexity compared to convention bypass clutches. It is another object to reduce the production and assembly cost of a bypass clutch. The advantages of this invention include elimination of a fluid seal, hub, spline, thrust washer and springs.

This invention accomplishes these objects with the additional advantage that the number of parts is minimized and the construction is simplified in relation to a conventional bypass clutch arrangement.

In realizing these objects and advantages, a bypass clutch, according to this invention, includes a cover supported for rotation about an axis, having a mounting surface, and a first friction surface spaced radially from the mounting surface; and a piston located adjacent the cover, having a second friction surface facing and adjacent the first friction surface, fixed to the cover at the mounting surface for rotation therewith and for elastic bending deflection relative to the first friction surface in response to differential pressure across the piston.

BRIEF DESCRIPTION OF THE DRAWINGS

FIG. 2 is a modification of the torque converter of FIG. 1 showing the region of the bypass clutch piston and damper retainer.

FIG. 3 is a cross section showing an alternate embodiment of the invention.

FIG. 4 is a front view of the axially outer surface of the cover.

FIG. 5 is a cross section taken at plane 5—5 of FIG. 4.

FIG. 6 is a cross section of the torque converter showing the turbine, damper and retainer taken at a plane defined by axial and lateral axes.

DESCRIPTION OF THE PREFERRED EMBODIMENT

Figure 1:
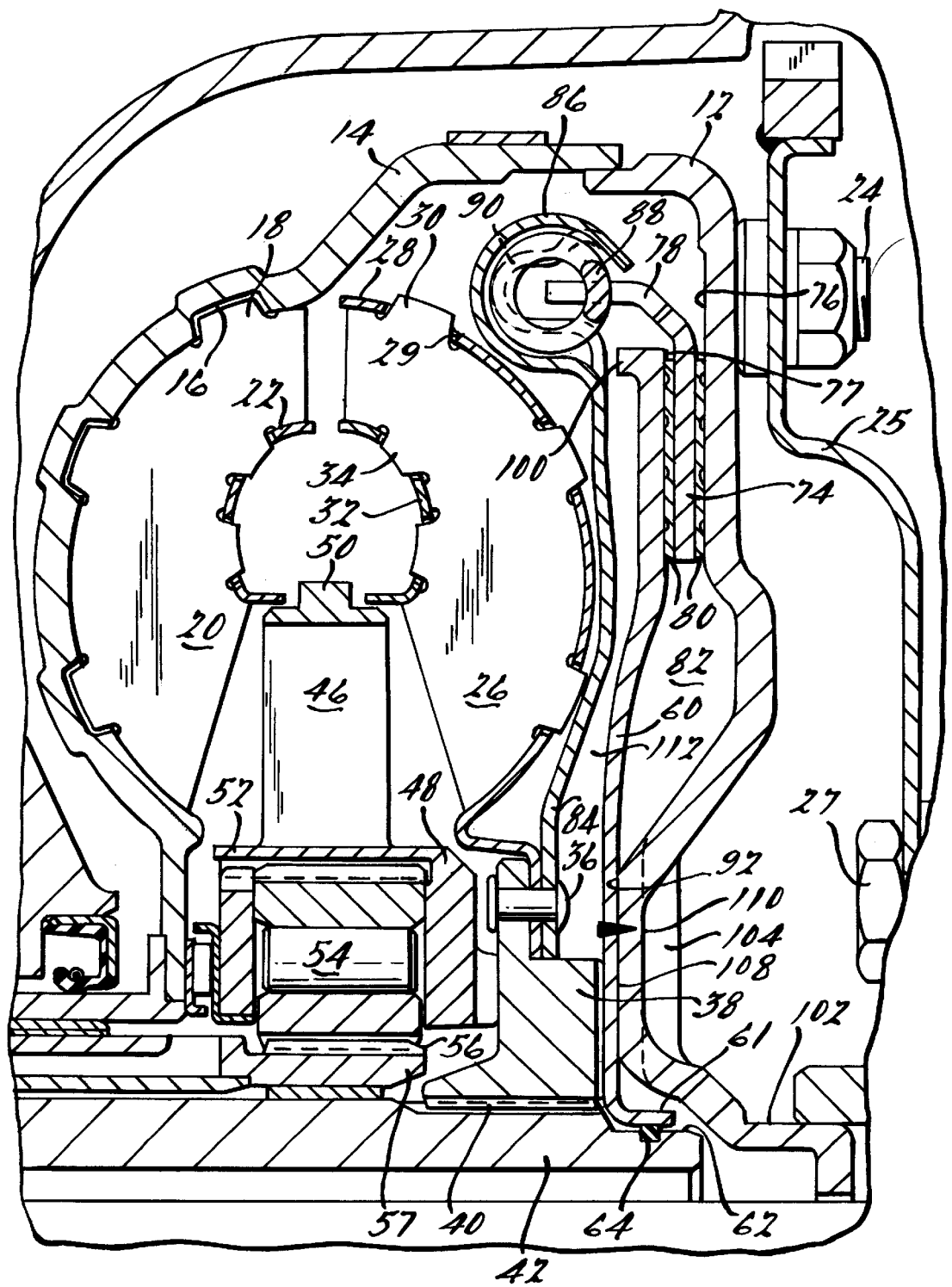
FIG. 1 is a cross section of a torque converter, taken at a plane defined by axial and lateral axes, showing a bypass clutch according to the invention.

Referring first to FIG. 1, a torque converter includes an impeller cover 12 welded to an impeller shell 14 having recesses 16, which receive tabs 18 located on the outer surface of impeller blades 20. The impeller blades are retained between shell 14 and an inner impeller shroud 22.

Impeller cover 12 supports a circular pattern of threaded studs 24 to which a flywheel 25, rotatably supported on an engine crankshaft, is connected by bolt 27, thereby driveably connecting the cover to the engine.

Turbine blades 26 are spaced mutually about the axis of rotation and are located with respect to the impeller blades so that a toroidal fluid flow path within the torque converter exits the impeller and enters the turbine at the radially outer area and leaves the turbine at the radially inner area. The outer periphery of the turbine blades is fixed mechanically or by welding or brazing to a turbine shell 28, which has openings 29 that receive tabs 30 formed on the turbine blades. The inner periphery of the turbine blades is connected to an inner turbine shroud 32 by locating tabs 34 within slots formed in shroud 32 and by bending the tabs over the inner surface of the shroud, thereby fixing the position of blades 26 between shell 28 and shroud 32. Turbine shell 28 and retainer 84 are secured by rivets 36 to a turbine hub 38 having an internally splined surface 40 adapted to engage an externally splined surface on a transmission input shaft 42.

Located between the flow exit section of the turbine and the flow entrance section of the impeller is a stator assembly comprising stator blades 46, spaced mutually around the axis of rotation, a hub 48 supporting blades 46, an inner shroud 50 connecting the radially inner tips of the stator blades, and an outer shroud 52 connecting the radially outer ends of the stator blades. An overrunning brake 54, fixed by splines 56 to a stationary sleeve shaft 57, provides a one-way drive connection between the stator wheel and the sleeve shaft.

A bypass clutch includes a piston 60 formed with a flange 61 that is slideably mounted on an axially directed surface 62 formed on input shaft 42 and sealed against the passage of hydraulic fluid by an O-ring seal 64, located in a recess formed in surface 62.

Piston 60 is fixed to a first, inner surface of impeller cover 12 by a 360 degree laser weld or resistance weld 72 located at a radially inner zone of the piston. The weld provides a seal against the passage of hydraulic fluid between the axially outer surface of piston 60 and the adjacent inner surface of the cover 12, secures the piston and cover for rotation as a unit, prevents axial sliding displacement of the piston relative to the cover, and allows flexural displacement of the piston relative to the cover. Cover 12 and piston 60 are driveably connected when the bypass clutch is fully engaged due to frictional engagement with a drive ring 74.

Drive ring 74 includes a radial leg, located between the axial inner face 76 of cover 12 and the axially outer surface 77 of piston 60; and axial legs 78, spaced mutually angularly about the axis of rotation and directed toward the turbine wheel. The surfaces of the radial leg that face cover 12 and piston 60 carry friction material 80, commonly referred to as "paper face" material, preferably bonded to the axially inner radial surface of plate 70 by a bonding technique described by Frosbie, Milek and Smith in SAE *Design Practices,* Vol. 5 (1962).

Drive ring 74 is supported for axial sliding displacement as it moves toward plate 70 due to contact with piston 60 and away from the plate as pressure within control chamber 82 varies in relation to pressure on the axially opposite side of the piston from that of chamber 82.

Each of the legs 78 of drive ring 74 is located for contact with a damper spring, as described below. The turbine shroud 28 and a torque converter damper spring retainer 84 are joined to a radially extending flange of turbine hub 38 at a riveted connection 36. At the radially outer end of retainer 84, several arcuate spring retainer flanges 86, spaced angularly about the axis at intervals corresponding to the location and arcuate lengths of the damper springs 88, are formed integrally with retainer 84. Flanges 86 define a substantially circular tubular cavity, in which are located four angularly spaced, helically-coiled damper springs 88. Preferably, two longer damper springs are formed with an actuate shape; two shorter springs are formed straight and then bent to the contour of the arcuate flanges 86, in which they are located. At four angularly spaced locations about the central axis of the torque converter, flange 86 of the damper retainer support 84 is formed integrally with local stop flanges 90, which define the extremities of annular pockets of the damper where each spring 88 is located. Each stop flange provides a surface that contacts and stops an end of a spring from moving in response to displacement of the legs 78. Details of the damper assembly are described in U.S. Ser. No. 08/891,911, filed Jul. 14, 1997, which application is assigned to the assignee of this invention.

Piston 60 is supported on surface 92 of the cover for bending through the piston thickness axially toward drive ring 74 due to differential hydraulic pressure across the piston and axial displacement away from the drive plate as pressure within control chamber 82 rises in relation to pressure on the axially opposite side of the piston. Piston 60 also rotates about the axis due to its driveably connection to the cover, which is connected to the engine crankshaft. This rotary movement of the piston forces legs 78 into contact with the ends of springs 88 causing them to compress, store energy and dissipate energy due to contact of the spring on the inner surfaces of flanges 86.

Each of the axially directed legs 78 of the drive ring 74 is located within a space located between angularly opposite ends of each of the damper springs. Engine torque is transmitted through piston 60 to the damper assembly by bearing contact between axial legs 78 and the adjacent ends of the damper springs.

Chamber 82, bounded by piston 60, cover 12, and drive ring 74, is a control pressure chamber, which communicates with a control pressure source through fluid passages formed in the cover. By controlling pressure in chamber 82, a pressure differential across piston 60 can be controlled. The pressure in the torus flow cavity on the left-hand side of piston 60 tends to move the piston and ring 74 rightward. This movement causes the mutually facing surfaces on cover 12, ring 74 and piston 60 to become driveably engaged due to frictional contact. By appropriately modulating the pressure in chamber 82, controlled slipping will occur between the cover and piston. Torque fluctuation developed in the driveline due to engine torque perturbations and other torque transmitting irregularities are modulated through operation of the damper assembly.

The piston 60 is driveably connected through the damper assembly resiliently through the damper springs to retainer 84, via the attachment at rivets 36 to the turbine shell 28 and turbine wheel, and through hub 38 to the transmission input shaft 42.

FIG. 2 shows a piston 61 located at the right-hand extremity of its bending deflection in contact with drive ring 74, which is driveably engaged with cover 12. The piston is forced to this position due to the pressure differential across the piston. The piston 61 is formed of 1035 steel and is approximately 1.5 mm thick. When differential pressure across the clutch piston 60 decreases, the piston deflects leftward away from drive ring 74, thereby disengaging the bypass clutch.

FIG. 3 shows an alternate form of a piston 63. A plate 96 is fixed at the outer periphery of the piston, preferably by a 360 degree laser weld 98, which prevents fluid flow past the piston-plate interface. The plate adds bending stiffness to the piston in the region of contact with the drive plate 74.

The piston shown in FIG. 1 is preferably formed by a flow forming process, in which the workpiece is contacted by rollers that force material radially outward to thicken the radially outer region adjacent drive ring 74 and to form the stiffening flange 100. Flow forming produces a relatively small piston thickness at the radially inner region and thicker metal at the radially outer region.

FIG. 4 is a side view of the cover showing the axially outer surface formed with a central cylinder 102 surrounding the axis A of the torque converter. Four fluid passages 104, seen best in FIG. 5, are formed by embossing four local beads 106, spaced angularly on the cover about axis A. The fluid passages are directly radially and are bounded by the surface 108 on piston 60 that contacts surface 92 and the inner surface 110 of the beads. Fluid from a controlled fluid pressure source is carried through input shaft 42 to cylinder 102, through the space between piston 60 and the cylinder, radially outward through passages 104 to chamber 82. The pressure source supplies fluid at elevated pressure to disengage the bypass clutch and vents chamber 82 to permit pressure in apply chamber 112 to engage the bypass clutch seal 64.

FIG. 6 shows the damper, turbine wheel and turbine hub 38 in cross section.

This invention eliminates a second fluid seal between the input shaft and turbine hub, a spline, thrust washer and spring that formerly were required to move the piston away from the drive ring in order to disengage the clutch. Notice that piston 60 functions as a thrust washer between the cover and hub 38. This arrangement reduces the axial length of the assembly and reduces the space required for the torque converter.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A bypass clutch for the torque converter of an automatic transmission for an automotive vehicle, comprising:

a cover supported for rotation about an axis, having a mounting surface, and a first friction surface spaced radially from the mounting surface; and a piston located adjacent the cover, having a second friction surface facing and adjacent the first friction surface, fixed to the cover at the mounting surface for rotation therewith and for elastic bending deflection relative to the first friction surface in response to differential pressure across the piston.

2. The clutch of claim 1, further comprising:

a drive ring located between the first friction surface and the second friction surface, supported for axial sliding movement, having a first surface facing the first friction surface and second surfaces facing the second friction surface, adapted for mutual drive engagement with the piston and cover in response to movement of the piston toward the drive ring and cover, the piston adapted to driveably engage the drive ring and the drive ring adapted to driveably engage the clutch plate as the clutch is applied and the piston deflects.

3. The clutch of claim 1 further comprising:

a control chamber located radially outward from the mounting surface between the cover and piston;

a fluid pressure source;

the mounting surface and piston are in mutual contact, the mounting surface having mutually spaced beads directed away from the piston, each space bounded by the piston and a bead defining a fluid passage communicating said fluid pressure source and said control chamber.

4. The clutch of claim 1 further comprising a laser weld extending around the axis mutually connecting the piston and cover at the mounting surface.

5. The clutch of claim 1 further comprising:

a transmission shaft located radially inward from the mounting surface;

the piston having a flange surface adjacent the shaft; and a seal contacting the shaft and flange surface, for sealing a space between the piston and shaft against the passage of fluid.

6. The clutch of claim 1 further comprising:

a bladed turbine wheel having a hub facing the cover, the piston having a surface located between the hub and cover.

7. A bypass clutch for the torque converter of an automatic transmission for an automotive vehicle, comprising:

a cover supported for rotation about an axis, having a mounting surface, and a first friction surface spaced radially from the mounting surface;

a piston located adjacent the cover, having a second friction surface facing and adjacent the first friction surface, fixed to the cover at the mounting surface for rotation therewith and for elastic bending deflection relative to the first friction surface in response to differential pressure across the piston;

a control chamber located radially outward from the mounting surface between the cover and piston; and a fluid pressure source;

the mounting surface and piston being in mutual contact, the mounting surface having mutually spaced beads directed away from the piston, each space bounded by the piston and a bead defining a fluid passage communicating said fluid pressure source and said control chamber.

8. The clutch of claim 7, further comprising:

a drive ring located between the first friction surface and the second friction surface, supported for axial sliding movement, having a first surface facing the first friction surface and second surfaces facing the second friction surface, adapted for mutual drive engagement with the piston and cover in response to movement of the piston toward the drive ring and cover.

9. The clutch of claim 7 further comprising a laser weld extending around the axis mutually connecting the piston and cover at the mounting surface.

10. The clutch of claim 7 further comprising:

a transmission shaft located radially inward from the mounting surface;

the piston having a flange surface adjacent the shaft; and a seal contacting the shaft and flange surface, for sealing a space between the piston and shaft against the passage of fluid.

11. In a torque converter, a bypass clutch for the torque converter of an automatic transmission for an automotive vehicle, comprising:

a turbine wheel supported for rotation about an axis, having a hub;

an impeller supported for rotation about an axis, having a mounting surface, and a first friction surface spaced radially from the mounting surface;

a piston located adjacent the cover, having a second friction surface facing and adjacent the first friction surface, fixed to the cover at the mounting surface for rotation therewith and for elastic bending deflection relative to the first friction surface in response to differential pressure across the piston;

a drive ring located between the first friction surface and the second friction surface, supported for axial sliding movement, having a first surface facing the first friction surface and second surfaces facing the second friction surface, and legs spaced mutually about the axis, adapted for mutual drive engagement with the piston and cover in response to movement of the piston toward the drive ring and cover, the piston adapted to driveably engage the drive ring and the drive ring adapted to driveably engage the clutch plate as the clutch is applied and the piston deflects; and a retainer driveably fixed to the hub, located adjacent the piston, having a flange formed integrally with the retainer and extending annularly about a radial outer periphery thereof, the flange defining annular pockets spaced mutually about the axis, each pocket adapted to partially surround a coiled spring and having an opening facing the piston legs, and stop flanges located between successive retaining flanges, each stop flange adapted to contact a spring and limit movement of a spring within an adjacent pocket, defining a space adapted to receive a drive ring leg therein.

12. The clutch of claim 11, further comprising:

a control chamber located radially outward from the mounting surface between the cover and piston;

a fluid pressure source;

the mounting surface and piston are in mutual contact, the mounting surface having mutually spaced beads directed away from the piston, each space bounded by the piston and a bead defining a fluid passage communicating said fluid pressure source and said control chamber.

13. The clutch of claim 11 further comprising a laser weld extending around the axis mutually connecting the piston and cover at the mounting surface.

14. The clutch of claim 11 further comprising:

a transmission shaft located radially inward from the mounting surface;

the piston having a flange surface adjacent the shaft; and a seal contacting the shaft and flange surface, for sealing a space between the piston and shaft against the passage of fluid.

15. The clutch of claim 11 further comprising:

a bladed turbine wheel having a hub facing the cover, the piston having a surface located between the hub and cover.

16. The damper assembly of claim 11 further comprising springs, each spring located in a pocket, having a first end contacted by a drive ring leg for displacement therewith, and a second end contacted by a stop flange that limits displacement of the spring.

17. The damper assembly of claim 11 wherein the piston further comprises:

a flange located at a radially inner surface thereof, slidably mounted on the turbine hub;

a web directed radially outward from the flange, having a folded hem located at a radially outer surface, supporting the surface thereon radially between the hem and flange, the surface directed toward the friction surface, the legs directed from the hem toward the retainer, each leg located in the space defined by a stop flange to receive a piston leg therein.

18. The damper assembly of claim 11 wherein the piston surface is substantially parallel to the friction surface of the impeller casing.

19. The damper assembly of claim 11 wherein each annular pocket of the retainer surrounding a spring retains a spring therein and prevents radial and axial displacement of the spring from the pocket.

* * * * *